(12) United States Patent
Song et al.

(10) Patent No.: US 9,874,943 B2
(45) Date of Patent: Jan. 23, 2018

(54) OPTICAL NAVIGATION DEVICE WITH ENHANCED TRACKING SPEED

(71) Applicant: PIXART IMAGING (PENANG) SDN. BHD., Penang (MY)

(72) Inventors: Willie Song, Penang (MY); Zi Hao Tan, Penang (MY); Joon Chok Lee, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 1 day.

(21) Appl. No.: 14/597,592

(22) Filed: Jan. 15, 2015

(65) Prior Publication Data

US 2016/0209936 A1 Jul. 21, 2016

(51) Int. Cl.
*G06F 3/03* (2006.01)
*H04N 5/374* (2011.01)
*G06F 3/038* (2013.01)
*G06F 3/0354* (2013.01)

(52) U.S. Cl.
CPC ............ *G06F 3/0317* (2013.01); *G06F 3/038* (2013.01); *G06F 3/03543* (2013.01); *H04N 5/374* (2013.01)

(58) Field of Classification Search
None
See application file for complete search history.

(56) References Cited

U.S. PATENT DOCUMENTS

| 2003/0058218 A1* | 3/2003 | Crane | G06F 3/0317 345/158 |
| 2006/0033015 A1* | 2/2006 | Feldmeier | G06F 1/3203 250/221 |
| 2007/0146325 A1* | 6/2007 | Poston | G06F 3/0317 345/163 |
| 2009/0313585 A1* | 12/2009 | Hellinger | A61B 5/7425 715/850 |
| 2011/0074683 A1* | 3/2011 | Bilbrey | H04N 1/00347 345/166 |
| 2013/0076629 A1* | 3/2013 | Lin | G06F 3/0317 345/166 |

* cited by examiner

*Primary Examiner* — Duane N Taylor, Jr.
(74) *Attorney, Agent, or Firm* — Li & Cai Intellectual Property (USA) Office

(57) ABSTRACT

An optical navigation device for controlling an operation of a pointer on a display apparatus is provided, the optical navigation device includes a device body, a substrate, a light source, an image sensor, and a processing module. The light source, the image sensor, and the processing module are respectively disposed on the substrate. The device body has a housing with an accommodating space formed therein. The substrate is arranged in the accommodating space of the housing. The light source operatively generates a light illuminating a navigation surface of the optical navigation device through the opening of the housing. The image sensor is oriented at a preset angle with respect to a long axis of device body and is configured for capturing images of the navigation surface. The processing module generates a displacement information of the optical navigation device relative to the navigation surface according to the images captured.

20 Claims, 8 Drawing Sheets

OPTICAL NAVIGATION DEVICE WITH ENHANCED TRACKING SPEED

BACKGROUND

1. Technical Field

The present disclosure relates to an optical navigation device in particular, to an optical navigation device with enhanced tracking speed.

2. Description of Related Art

Optical navigation devices, such as optical mice, are operable to direct movement information thereof to a graphical user interface on a display by tracking relative movement between a navigation surface, such as a mouse pad, and a built-in image sensor in the optical navigation devices.

More specifically, an optical navigation device typically includes a light source, such as a light emitting diode (LED) or a laser diode, for illuminating the navigation surface underneath the optical navigation device, and an image sensor for capturing images of the navigation surface. As the optical navigation device moves across the navigation surface, the light source is turned on at a constant frequency based on a predetermined frame rate of the image sensor to optically radiate light onto the navigation surface, and the image sensor receives the light reflected from the navigation surface to successively capture frames of the navigation surface for the optical navigation device to track the displacement thereof relative to the navigation surface, so as to operate the graphical user interface.

In practice, optical navigation devices are generally battery-powered, and because of this, a compromise between power consumption and tracking performance generally must be made. For example, optical navigation devices tend to provide faster response and more accurate tracking results as the predetermined frame rate of the image sensor increases, i.e., capturing more frames per second, which would require the light source thereof to be turned on more frequently and an increase in computational loading for analyzing images captured, thus drawing more power. Therefore, a pressing need has been recognized for a design of an optical navigation device that can provide greater precision and faster reaction speed across a greater range of tracking speeds and a greater variety of surfaces while consuming less power.

SUMMARY

Accordingly, an exemplary embodiment of the present disclosure provides a simple and inexpensive modification design for the optical navigation device, to enhance the tracking speed of the optical navigation device.

An exemplary embodiment of the present disclosure provides an optical navigation device, which is adapted to control an operation of a pointer on a display apparatus. The optical navigation device includes a device body, a substrate having a lower surface, a light source, an image sensor, and a processing module. The light source, the image sensor, and the processing module are respectively disposed on the lower surface of the substrate. The processing module is coupled to the light source and the image sensor. The device body includes a housing with an opening. The housing has an accommodating space formed therein. The substrate is arranged in the accommodating space of the housing. The light source operatively generates a light illuminating a navigation surface of the optical navigation device through the opening of the housing. The image sensor is configured to capture a plurality of images responsive to a reflected light reflected from the navigation surface to generate a plurality of frames according to a predetermined frame rate. The image sensor is oriented at a preset angle with respect to a long axis of the device body. The processing module is configured to operatively generate a displacement information of the optical navigation device relative to the navigation surface according to at least one of the plurality of frames.

An exemplary embodiment of the present disclosure provides an optical mouse. The optical navigation device includes a mouse body, a substrate having a lower surface, a light source, an image sensor, and a processing module. The light source, the image sensor, and the processing module are respectively disposed on the lower surface of the substrate. The processing module is coupled to the light source and the image sensor. The mouse body includes a housing with an opening. The housing has an accommodating space formed therein. The substrate is arranged in the accommodating space of the housing. The light source operatively generates a light illuminating a navigation surface of the optical mouse through the opening of the housing. The image sensor is configured to capture a plurality of images responsive to a reflected light reflected from the navigation surface to generate a plurality of frames according to a predetermined frame rate. The processing module is configured to operatively generate a displacement information of the optical mouse relative to the navigation surface according to at least one of the plurality of frames. The image sensor is oriented at a preset angle between 0 to 90 degrees exclusive with respect to a long axis of the mouse body.

According to one exemplary embodiment of the present disclosure, the image sensor is oriented substantially at 45 degree with respect to the long axis of the mouse body.

To sum up, an exemplary embodiment of the present disclosure provides an optical navigation device, such as an optical mouse, which has a built-in image sensor that is oriented at an angle with respect to a long axis of the optical navigation device and enables the optical navigation device to achieve high tracking speed. Moreover, the rotated image sensor can attain the same tracking speed as the non-rotated image sensor with lower frame rate, thereby effectively reducing the power consumption of the optical navigation device. Additionally, the rotation process of the image sensor can be done during the assembly process of the optical navigation device without having to incur any additional manufacturing or design cost.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1A:
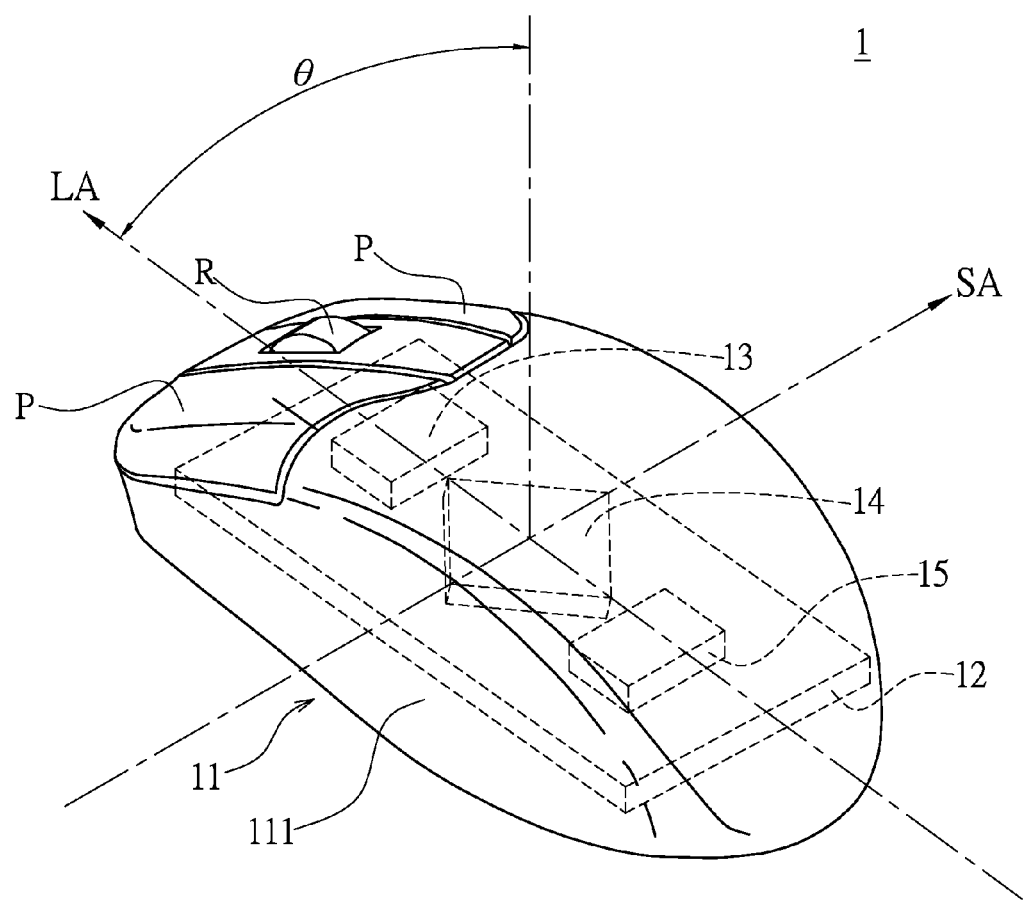
FIG. 1A is a perspective view illustrating an optical navigation device provided in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Drawings are provided in the present disclosure to illustrate the general structures of the present disclosure, some sizes of structures or portions in the drawings provided may be exaggerated relative to sizes of other structures or portions for illustration purposes. It shall be appreciated by those of skill in the art, relative terms and phrases such as "on" or "over" are used herein to describe one structure's or portion's relationship to another structure or portion as illustrated in the drawings. It shall be understood that such relative terms are intended to encompass different orientations of the device in addition to the orientation depicted in the drawing. For example, if the component or the device in the drawing is turned over, rotated, or both, the structure or the portion described as "on" or "over" other structures or portions would now be oriented "below," "under," "left of," "right of," "in front of," or "behind" the other structures or portions.

The terms "at an angle," "angled," and "slanted," as used herein are to be interpreted as meaning at any angle, with respect to some stated reference point, that is not exactly parallel or exactly perpendicular.

The objective of the present disclosure is to provide a new simple and low cost architecture design for an optical navigation device, such as optical mouse, which can enhance and increase the tracking performance of the optical navigation device over various navigation surfaces and minimize the power consumed by the tracking operation.

Information regarding the detailed structure, as well as the basic operations of the optical navigation device including image capturing and analyzing operations, displacement computation, and cursor control operation are commonly known to those skilled in the art. Hence detailed explanations are omitted herein, and only the related information concerning the present disclosure will be provided.

Figure 1B:
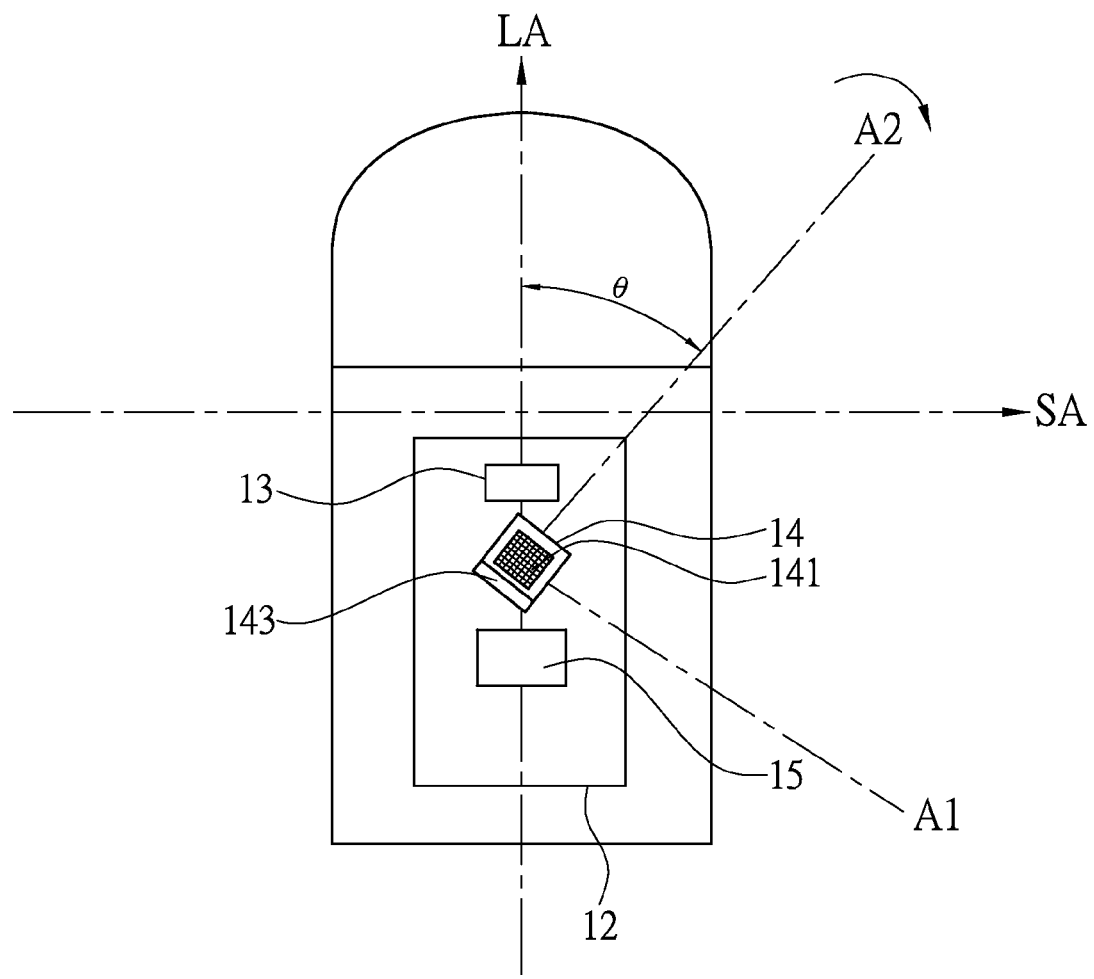
FIG. 1B is a top view illustrating the orientation of the image sensor in the optical navigation device depicted in FIG. 1A provided in accordance to an exemplary embodiment of the present disclosure.

Please refer to FIG. 1A and FIG. 1B at the same time. FIG. 1A shows a perspective of an optical navigation device provided in accordance to an exemplary embodiment of the present disclosure. FIG. 1B shows a top view illustrating the orientation of the image sensor in the optical navigation device depicted in FIG. 1A.

An optical navigation device 1, such as an optical mouse or any other optical motion tracker, is adapted to control an operation of a pointer (not shown) or a graphical user interface displayed on a display apparatus (not shown). Particularly, the optical navigation device 1 operates on a navigation surface (e.g., a mouse pad or a desktop) and operatively detects a relative movement thereof with respect to the navigation surface. The optical navigation device 1 further transmits the relative movement detected to the display apparatus to control the operation of the pointer or the graphical user interface on the display apparatus.

The optical navigation device 1 includes a device body 11 (e.g., the mouse body of an optical mouse) and a substrate 12. The device body 11 has a long axis LA and a short axis SA, wherein the short axis SA is perpendicular to the long axis LA. The long axis LA of the device body 11 is parallel to the moving direction of the optical navigation device 1.

The device body 11 further includes a housing 111 with an opening (not shown), wherein the opening is formed in a bottom surface of the housing 111. The housing 111 further has an accommodating space formed therein.

The substrate 12 has a lower surface and is arranged in the accommodating space of the housing 111. The substrate 12 may be a semiconductor mounting substrate, a printed circuit board, or any other wired board, for supporting electronic components.

The optical navigation device 1 further includes a roller R mounted rotatably on the housing 111 and two pressing buttons P mounted on the housing 111 for user operation. The roller R and the pressing buttons P represent conventional components or features of a conventional optical mouse that are well-known to those skilled in the art, hence are not described in detail for purposes of clarity and conciseness except as needed to assist in understanding the operation of the optical navigation device 1.

Moreover, details of the circuitry configuration and the internal structure of the optical navigation device 1 are hidden from FIG. 1A and FIG. 1B, such that the circuitry configuration and the internal structure can be changed without impacting the application. Therefore, it is worth to note that while FIG. 1A and FIG. 1B respectively depict a portable optical mouse, it shall be understood that the architecture depicted can be used in any other suitable mouse, such as a wired optical mouse. FIG. 1A and FIG. 1B are merely used to illustrate the orientation of the image sensor 14 in the optical navigation device 1 and the present disclosure is not used to limited.

Figure 2:
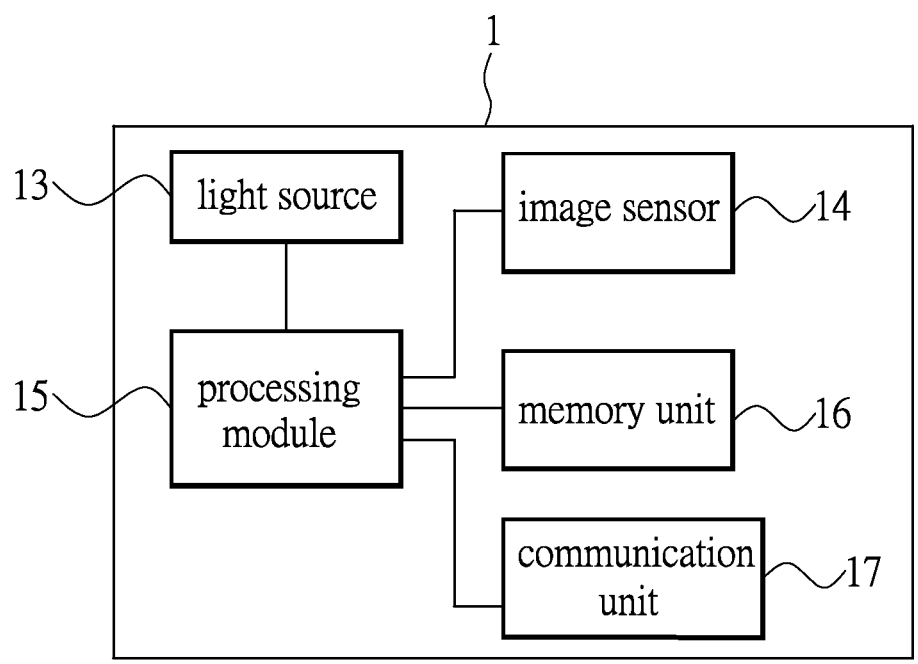
FIG. 2 is a schematic block diagram of an optical navigation device provided in accordance to an exemplary embodiment of the present disclosure.

Please refer to FIG. 2 in conjunction with FIG. 1A and FIG. 1B for further details on internal electrical connections of the optical navigation device 1. FIG. 2 shows a schematic block diagram of an optical navigation device provided in accordance to an exemplary embodiment of the present disclosure.

As shown in FIG. 2, the optical navigation device 1 includes a light source 13, an image sensor 14, a processing module 15, a memory unit 16, and a communication unit 17. The light source 13, the image sensor 14, the processing module 15, the memory unit 16, and the communication unit 17 are respectively disposed on the lower surface of the substrate 12. Moreover, the light source 13, the image sensor 14, the memory unit 16, and the communication unit 17 are respectively coupled to the processing module 15.

The light source 13 is configured to operatively generate a light illuminating the navigation surface underneath the optical navigation device 1 through the opening of the housing 111 at a predetermined frequency. The light source 13 can be configured to emit an invisible or a visible light depend on the operation requirement of the optical navigation device 1. The light source 13 may comprise one or more of light-emitting diode (LED), laser diode (LD), Organic LED (OLED), or any other suitable light emitting element, and the present disclosure is not limited thereto.

The image sensor 14 is configured to operatively capture a plurality of images responsive to a reflected light reflected from the navigation surface through the opening to generate a plurality of frames according to a predetermined frame rate. The predetermined frequency of the illumination operation associated with the light source 13 can be adjusted according to the predetermined frame rate.

As illustrated in FIG. 1B, the image sensor 14 includes an imaging array 141 for capturing images of the navigation surface and generating frames, and a sensor circuitry 143 for controlling the operation of the imaging array 141. In one embodiment, the imaging array 141 and the sensor circuitry 143 can be fabricated onto a single integrated circuit (IC). In another embodiment, additional functionality, including for example, the functionality of the image analyzation and signal communication (e.g., the functionality of the communication unit 17) can be incorporated into the same IC.

Figure 3:
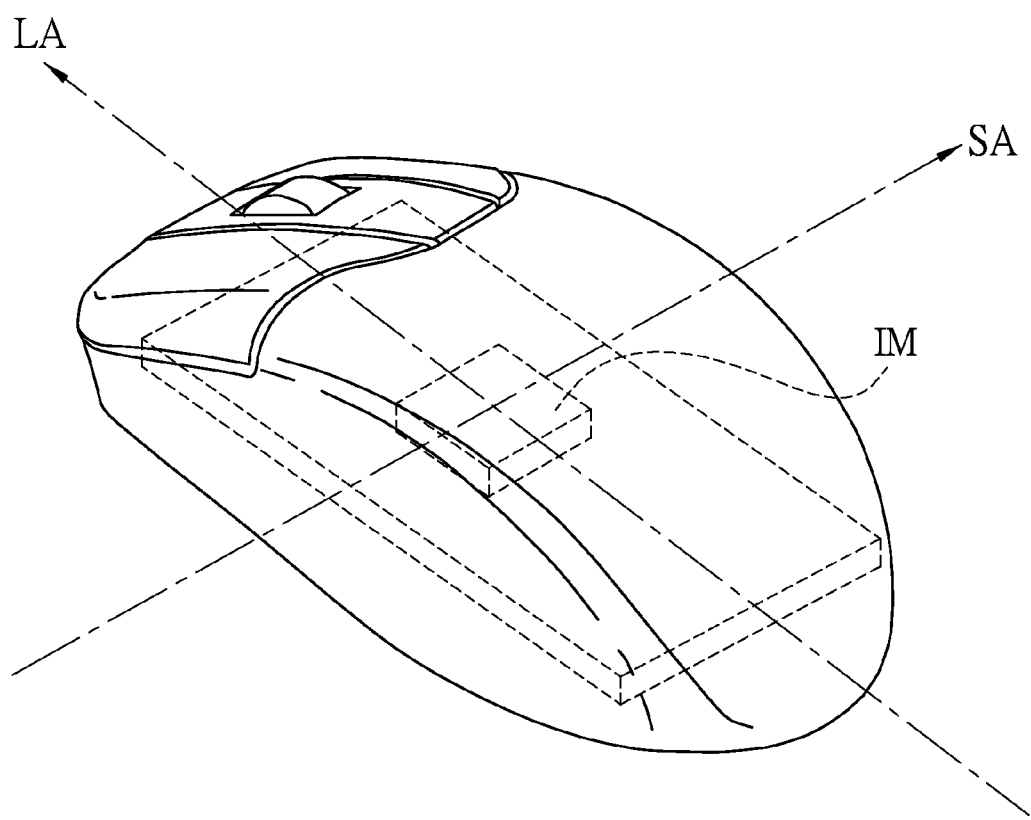
FIG. 3 is a perspective view illustrating a conventional optical mouse.

To put it concretely, FIG. 3 shows a perspective view illustrating a conventional optical mouse. In the structure of a conventional optical mouse depicted in FIG. 3, an image sensor IM is generally oriented along with the moving direction of the conventional optical mouse, i.e., the x-axis direction of the imaging array of the image sensor IM is parallel to the long axis LA of the conventional optical mouse and the y-axis direction of the imaging array of the image sensor IM is parallel to the short axis SA of the conventional optical mouse.

The image sensor IM of the conventional optical mouse is generally configured to track the same amount of distance in pixels along the x- and y-axis directions at each frame, i.e., the tracking speed of the conventional optical mouse is the same for both x- and y-axis directions, based on the size of the imaging array of the image sensor IM, as the optical mouse designer does not know in which direction the optical mouse moves more often. Moreover, for the ease of correlation computation, the correlation algorithm adopted by the conventional optical mouse is generally designed to correlate an image captured from the center of each image captured outwardly to a specific distance in all directions (i.e., correlated in a circular manner), therefore the corner area (e.g., corners of the imaging array) in this scheme will be underused. The tracking distance of the image sensor IM for each frame in any direction is the distance from the center pixel of the imaging array to an outermost pixel of the imaging array (e.g., the number of pixels between the center of the imaging array and the edge of the imaging array multiplies the dimension of each pixel therein) in the horizontal direction (e.g., x-axis direction) or the vertical direction (e.g., y-axis direction) of the imaging array.

Figure 4:
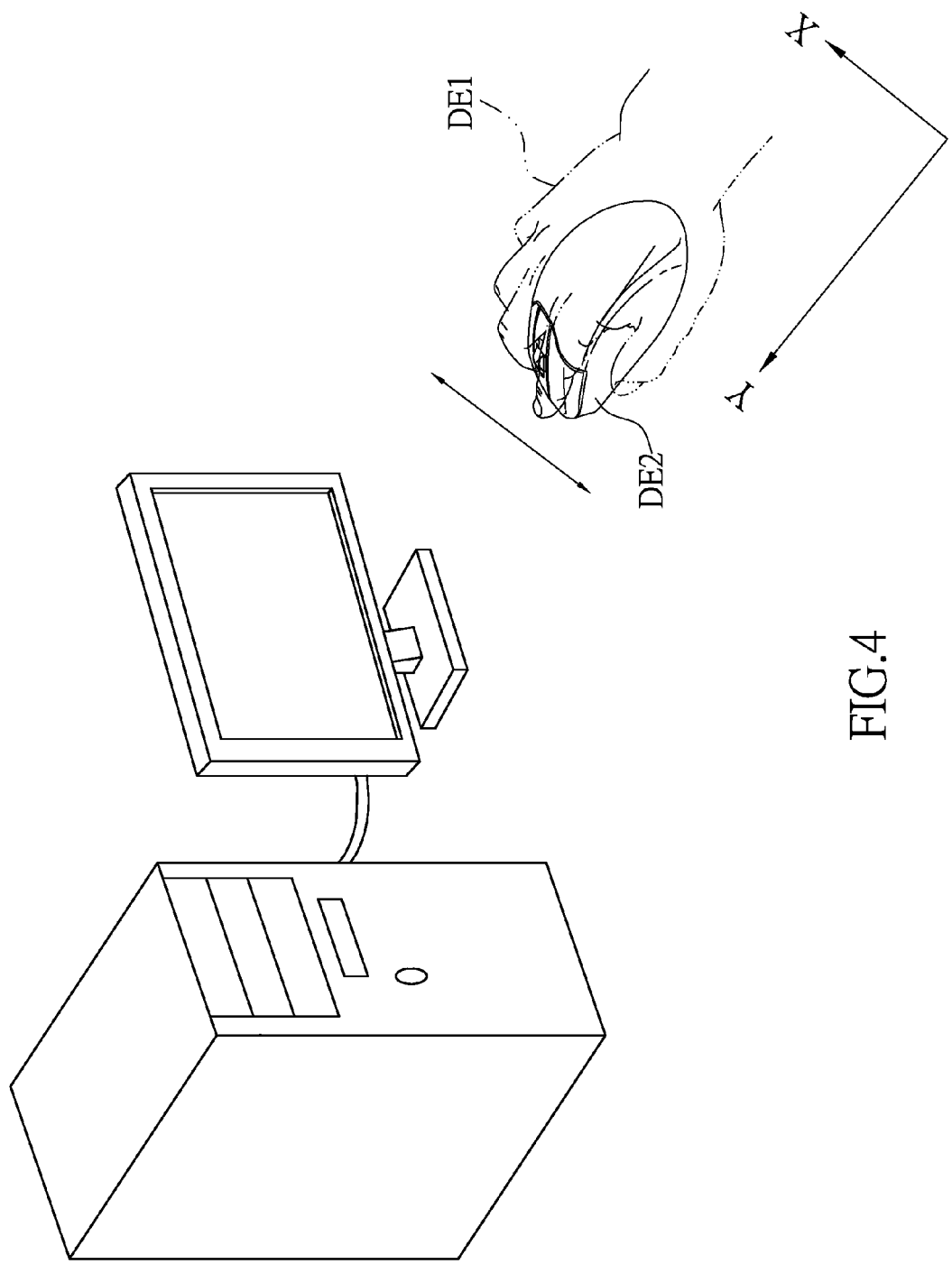
FIG. 4 is a diagram illustrating an operation the conventional optical mouse in an optical navigation system provided in accordance to an exemplary embodiment of the present disclosure.

However, often, as depicted in FIG. 4, while an end-user operates an optical mouse to perform operations on a computer, it is noted that the user frequently moves the optical mouse along the short axis direction (e.g., x-axis direction) of the optical mouse (i.e., moving in the left or right direction with respect to the mouse body) as depicted by directions DE1 and DE2.

Please refer back to FIG. 1B, unlike the conventional configuration of the image sensor IM for the conventional optical mouse, the image sensor 14 of the instant embodiment is oriented at a non-zero angle, i.e., at a preset angle θ, with respect to the long axis LA of device body 11. In particular, as shown in FIG. 1B, the image sensor 14 is oriented such that the y-axis A2 of the imaging array 141 of the image sensor 14 is at the preset angle θ with respect to the long axis LA of device body 11 and the x-axis A1 of the imaging array 141 of the image sensor 14 is at the preset angle θ with respect to the short axis SA of the device body 11.

The preset angle θ can range between 0 to 90 degrees exclusive with respect to the long axis LA of the device body 11 according to different applications of the optical navigation device 1. In one embodiment, the image sensor 14 is oriented at substantially a 45 degree angle with respect to the long axis LA of device body 11.

The concept of how orienting the image sensor 14 at the preset angle with respect to the long axis LA of the device body 11 enhances the tracking speed of the optical navigation device 1 will be explained in detail later, thus further description here is omitted.

Additionally, in one embodiment, the optical navigation device 1 can further include a sensor holder (not shown), wherein the sensor holder is mounted on the substrate 12 and the sensor holder is oriented at the preset angle with respect to the long axis LA of the device body 11 via soldering or other mounting techniques. The image sensor 14 is mounted on or placed in the sensor holder such that the image sensor 14 is oriented at the preset angle θ with respect to the long axis LA of the device body 11. The sensor holder may be manually rotated on a degree-by-degree basis according to different applications of the optical navigation device 1. In another embodiment, the image sensor 14 may be directly mounted on the substrate 12 via soldering technique (e.g., surface mount technique) or any other equivalent technique.

Moreover, the predetermined frame rate may be configured according to the operational requirement (such as the tracking operation requirement) of the optical navigation device 1. Specifically, the predetermined frame rate of the optical navigation device 1 may be configured according to the moving speed of the optical navigation device 1. In one embodiment, the predetermined frame rate may be configured to range from 800 frames per sec (fps)~8000 fps depend upon the practical operation requirement (e.g., power limitation, tracking speed, tracking accuracy, the brightness of the navigation surface, and the like) of the optical navigation device 1. Similarly, the exact size of the imaging array of the image sensor 14 as well as the size of each pixel of the imaging array may be designed according to the operation requirements of the optical navigation device 1 as well as the manufacturing capability.

The image sensor 14 may be implemented by a charge-coupled device (CCD) image sensor or a complementary metal oxide semiconductor (CMOS) sensor. Those skilled in the art should be able to design according to practical application requirements and the instant embodiment is not limited thereto.

In one embodiment, the optical navigation device 1 can further include at least one lens disposed between the image sensor 14 and the navigation surface. The lens is configured to direct the reflected light being reflected from the navigation surface through the opening of the housing 111 onto the active imaging array of the image sensor 14.

The processing module 15 is configured to analyze a movement of the optical navigation device 1 relative to the navigation surface according to at least one of the plurality of frames. Specifically, the processing module 15 computes the relative displacement and the velocity (i.e., the relative moving speed and the direction) of the optical navigation device 1 and generates a displacement information (e.g., the displacement vector of the optical navigation device 1) as the optical navigation device 1 is moved across the navigation surface.

In one embodiment, the processing module 15 can compare the images captured by the image sensor and determine the relative movement of the feature (e.g., the light pattern) between frames by correlating the common feature between successive frames captured. Image correlation techniques for computing displacement of the optical navigation device 1 are known techniques hence further description is hereby omitted.

Briefly, during the operation of the optical navigation device 1, the processing module 15 operatively controls the light source 13 to illuminate the navigation surface and the image sensor 14 to sequentially capture a plurality of images according to the predetermined frame rate, so as to generate a plurality of frames sequentially. The processing module 15 then computes the relative displacement of the optical navigation device 1 with respect to the navigation surface according to at least one frame to generate the displacement information of the optical navigation device 1. The processing module 15 further drives the communication unit 17 to transmit the displacement information to the display apparatus to control the operation of the pointer or the graphical user interface displayed on the display apparatus thereafter.

It is worth to mention that the processing module 15 may configure or adjust the lighting duration of the light source 13 each time the light source 13 emits light according to different applications or brightness of the navigation surface.

The memory unit 16 is configured to store the pixelated image data associated with images captured, the preset angle configured, and the displacement information computed. Incidentally, the preset angle can be written into the memory unit 16 via firmware design before factory shipment of the optical navigation device 1.

Figure 5A:
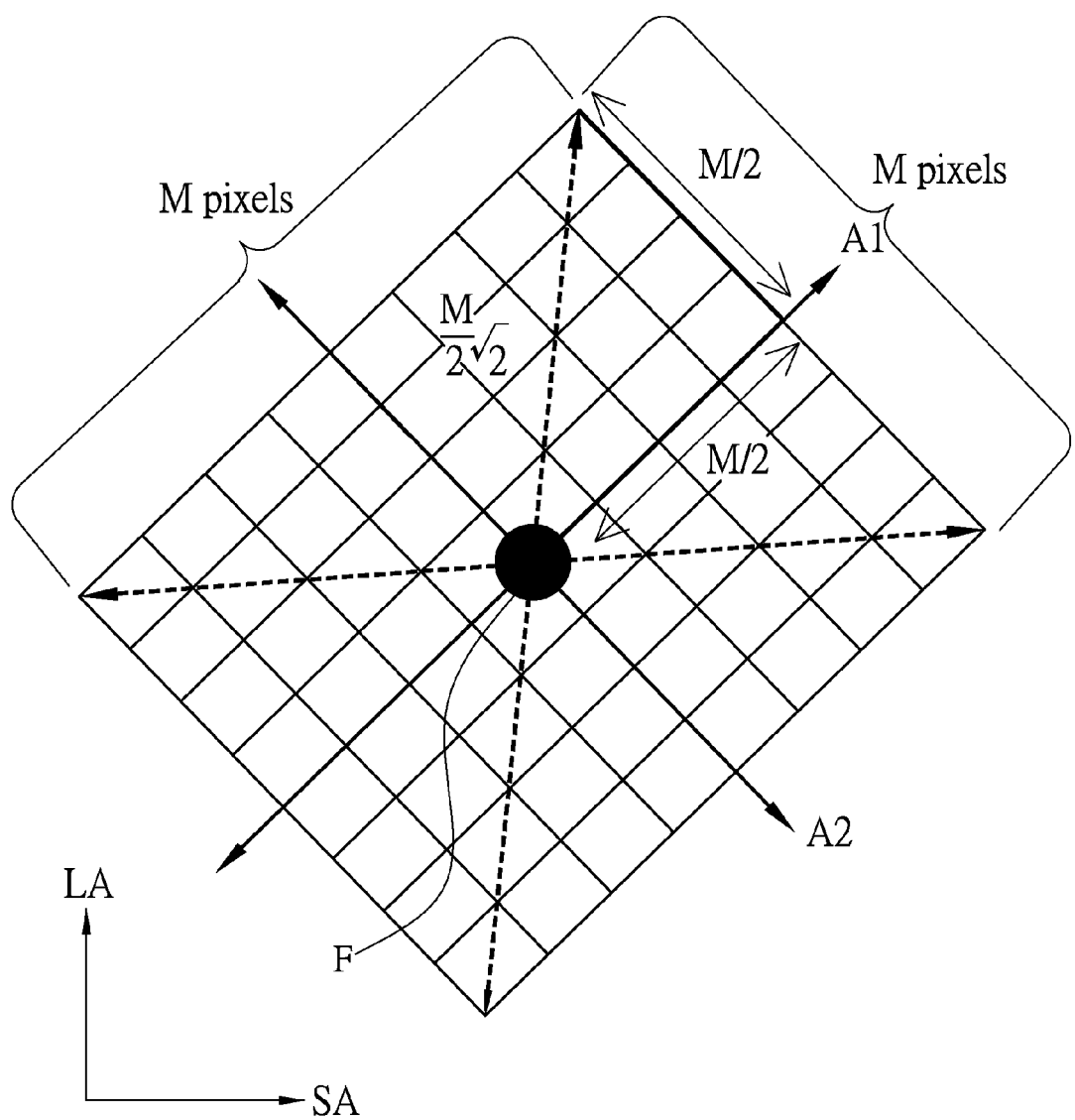
FIG. 5A and FIG. 5B are diagrams respectively illustrating active imaging arrays of the image sensor oriented at 45 degrees with respect to the long axis of the optical navigation device provided in accordance to an exemplary embodiment of the present disclosure.

A detailed description regarding how the rotation of the image sensor 13 improves the tracking performance of the optical navigation device 1 is provided in the following. Please refer to FIG. 5A, which shows a diagram illustrating an active imaging array of the image sensor provided in accordance to an exemplary embodiment of the present disclosure, in particular, FIG. 5A depicts the image sensor 14 having an M by M active imaging array (e.g., 8 by 8 active imaging array). Pixels in the active imaging array are configured to actively sense and capture an image. As previously described, the image sensor 14 is oriented at a 45 degree angle with respect to the long axis LA of the device body 11, wherein M is an integer.

As can be noted from FIG. 5A, unlike the conventional optical mouse depicted in FIG. 3, which tracks the same amount of distance in all tracking directions of the image sensor in each frame and often underuses the sensing area of the active imaging array (e.g., the corner area of the active imaging array), in the instant embodiment, the optical navigation device 1 has a minimum tracking distance of M/2 or 4 pixels per frame×the size of each pixel for tracking the feature F (e.g., the light pattern) and a maximum tracking distance of $$\frac{M}{2}\sqrt{2}$$

or $4\sqrt{2}$ pixels per frame×each pixel's size, wherein the maximum tracking distance is computed using trigonometry e.g., definition and property of 45-45-90 angle. In other words, by orientating the image sensor 14 substantially at a 45 degree angle with respect to the long axis LA of the device body 11, not only can the longest area of the active imaging array (i.e., area along the diagonal) be fully utilized, but also the tracking performance of the short axis SA (and the long axis LA of device body 11 can be enhanced as the tracking distance along the long and the short axes LA, SA of the device body 11 can be increased approximately by a factor of 1.41 while the tracking performance of the optical navigation device 1 along other directions is the same as the tracking performance of the conventional optical mouse with a non-rotated image sensor. Additionally, as illustrated in FIG. 4, an end-user in practice operates the optical navigation device frequently along the direction of the short axis SA, thus by increasing the tracking distance along the short axis SA direction, the overall tracking efficiency of the optical navigation device 1 can be greatly enhanced.

Figure 5B:
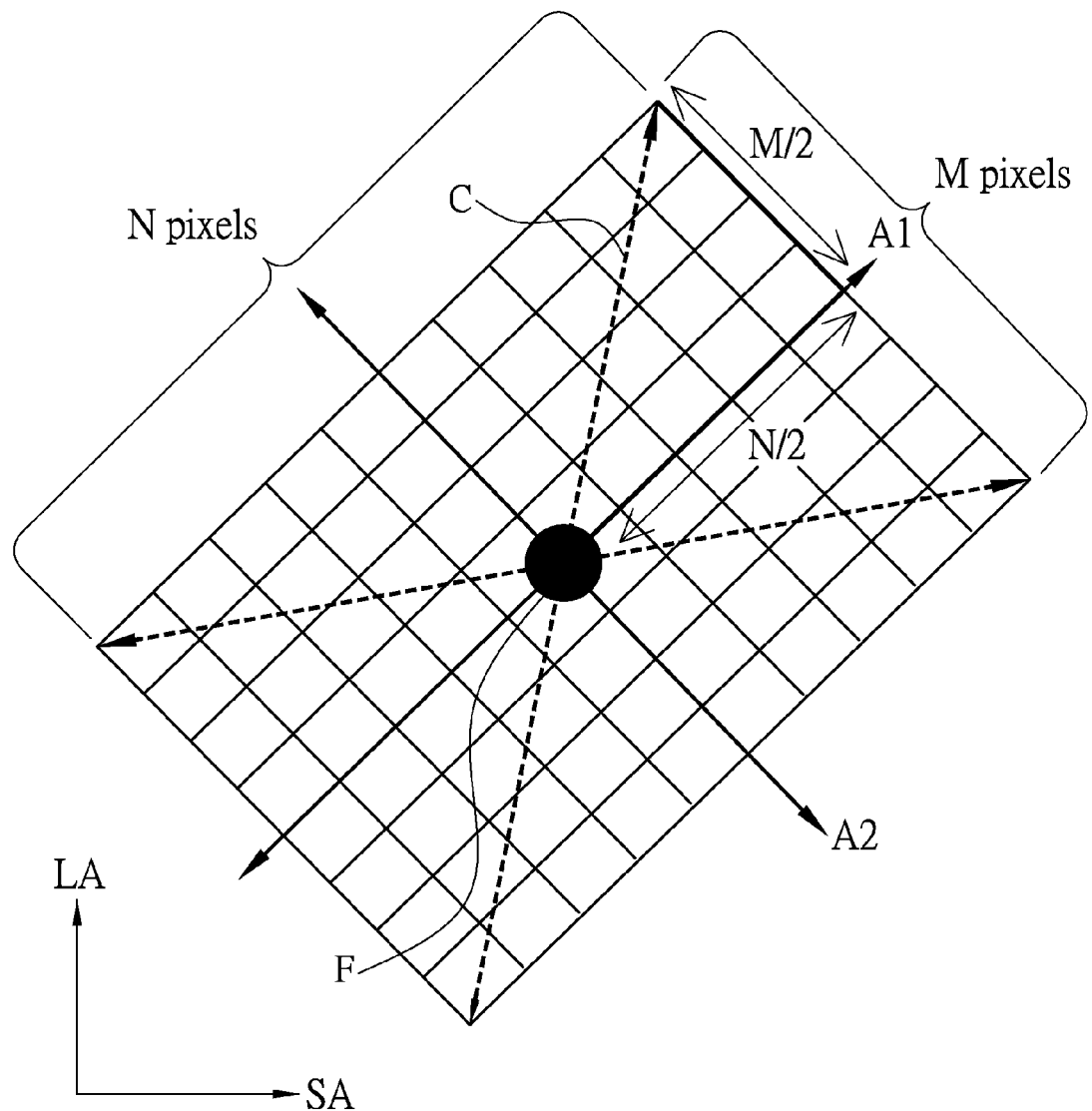

In another embodiment, the image sensor 14 may have a rectangular-shaped active imaging array or an M by N active imaging array (e.g., 8 by 10 active imaging array) as depicted in FIG. 5B as another example for further illustration, wherein M and N are integers. The maximum tracking distance c per frame for tracking the feature F (e.g., the light pattern) along either the short axis SA or the long axis LA of the device body 11 is $\sqrt{\left(\frac{M}{2}\right)^2 + \left(\frac{N}{2}\right)^2}$ or 6 pixels×the size of each pixel for M=8, N=10 computed using the Pythagorean theorem, while the minimum tracking distance per frame can be configured to be half of the shortest side, i.e., 4 pixels.

In short, in comparison to the conventional optical mouse with a non-rotated image sensor, the optical navigation device 1 can achieve higher tracking speed (which is equal to the tracking distance of the image sensor 14 per frame×the predetermined frame rate) for the same frame rate and the same size of imaging array of the image sensor. Similarly, a lower frame rate can be used with the rotated image sensor and it is able to generate the same tracking speed as the non-rotate image sensor, thereby minimizing the power to be consumed by the tracking operation.

Since when the image sensor 14 is rotated the entire coordinate system of the image sensor 14 will be also rotated, the relative displacement analyzed and reported by the optical navigation device 1 will be rotated, i.e. does not match the coordinate system of the display apparatus. Therefore, in order to properly and accurately control the operation of the pointer or the graphical user interface displayed on the display apparatus, either the correlation algorithm must be altered or the coordinate system of the image sensor must be calibrated or corrected. Thus, the present disclosure further provides various techniques for calibrating the displacement computed.

In one embodiment, the image sensor 14 may counter-rotate the plurality of images captured and generate frames accordingly based on the preset angle of the image sensor 14 relative to the long axis LA of the device body 11 for the processing module 15 to perform further image processing. In another embodiment, the image sensor 14 may output the frames corresponding to the raw image captured in the processing module 15 and the processing module 15 counter-rotates frames received thereafter to speed up the image capturing process.

In another embodiment, the processing module 15 can be configured to perform a coordinate transformation on a displacement vector of the optical navigation device 1 computed relative to the navigation surface according to at least one of the frames using a rotation matrix before transmitting the displacement vector to the display apparatus.

Figure 6:
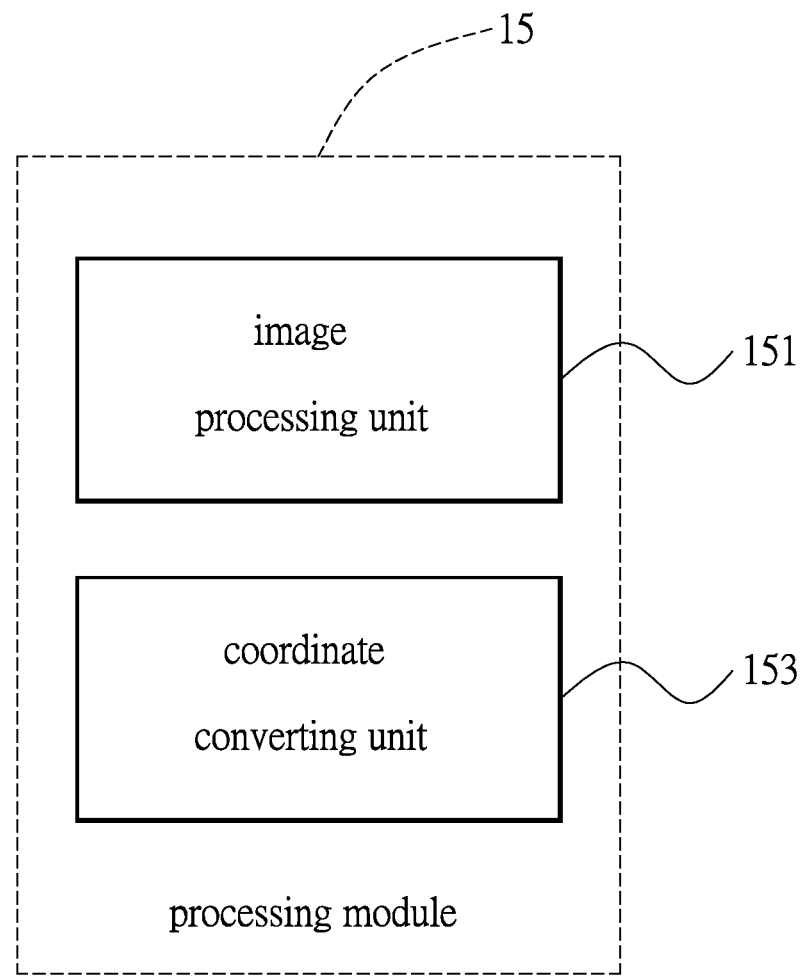
FIG. 6 is a schematic block diagram of a processing module provided in accordance to an exemplary embodiment of the present disclosure.

Please refer to FIG. 6 in conjunction with FIG. 1A and FIG. 2, wherein FIG. 6 shows a schematic block diagram of a processing module provided in accordance to an exemplary embodiment of the present disclosure. In the instant embodiment, the processing module 15 includes an image processing unit 151 and a coordinate converting unit 153. The image processing unit 151 is configured to perform image processing related to tracking operation including image filtering (e.g., applying a digital contours removal (DCR) filter to filter out the unwanted noise) and image correlation, to frames received from the image sensor 14, so as to generate a first displacement vector $\overline{D1}$ of the optical navigation device 1 relative to the navigation surface to the coordinate converting unit 153.

The coordinate converting unit 153 is configured to perform a coordinate transformation to the first displacement vector $\overline{D1}$ of the optical navigation device 1 and generate a second displacement vector $\overline{D2}$. Particularly, the coordinate converting unit 153 is configured to perform the coordinate transformation to the first displacement vector $\overline{D1}$ by applying a rotation matrix $\overline{R}$ to the first displacement vector $\overline{D1}$ to generate the second displacement vector $\overline{D2}$, wherein the rotation matrix $\overline{R}$ is configured based on the preset angle $\theta$ of the image sensor 14 with respect to the long axis LA of the device body 11.

The relationship between the first displacement vector $\overline{D1}$ and the second displacement vector $\overline{D2}$ can be described by Eq. 1, $$\overline{D2} = \overline{R} \cdot \overline{D1} \quad (1),$$

wherein $\overline{D1}$ represents the first displacement vector; $\overline{D2}$ represents the second displacement vector; $\overline{R}$ represents the rotation matrix. The rotation matrix $\overline{R}$ can be described by Eq. 2 below, $$\overline{R} = \begin{bmatrix} \cos\theta & -\sin\theta \\ \sin\theta & \cos\theta \end{bmatrix} \quad (2)$$

wherein $\overline{R}$ represents the rotation matrix; $\theta$ represents the preset angle at which the image sensor 14 is rotated with respect to the long axis LA of the device body 11.

For example, if the image sensor 14 is oriented at a 45 degree angle with respect to the long axis LA of the device body 11, the rotation matrix $\overline{R}$ is configured to be $$\begin{bmatrix} \cos 45° & -\sin 45° \\ \sin 45° & \cos 45° \end{bmatrix},$$

and the second displacement vector $\overline{D2}$ is $$\begin{bmatrix} \cos 45° & -\sin 45° \\ \sin 45° & \cos 45° \end{bmatrix} \overline{D1}.$$

For another example, if the image sensor 14 is oriented at a 65 degree angle with respect to the long axis LA of the device body 11, the rotation matrix $\overline{R}$ is configured to be $$\begin{bmatrix} \cos 65° & -\sin 65° \\ \sin 65° & \cos 65° \end{bmatrix},$$

and the second displacement vector $\overline{D2}$ is $$\begin{bmatrix} \cos 65° & -\sin 65° \\ \sin 65° & \cos 65° \end{bmatrix} \overline{D1},$$

and so on.

The processing module 15 then generates the displacement information of the optical navigation device 1 according to the second displacement vector $\overline{D2}$ computed after performing the coordinate transformation. The processing module 15 further can store the displacement information in the memory unit 16 and transmit the displacement information to the display apparatus.

Additionally, the rotation matrix $\overline{R}$ may be pre-configured according to the preset angle and pre-stored in the memory unit 16 for the coordinate converting unit 153 to read from and perform the coordinate transformation, accordingly.

In another embodiment, the display apparatus can be configured to apply the coordinate transformation to the displacement vector received from the optical navigation device 1 to reduce the computation loading of the optical navigation device 1. That is, the optical navigation device 1 may compute the displacement vector thereof relative to the navigation surface using the coordinate system of the image sensor 14 without applying any coordinate calibration (e.g., counter-rotation), generate the displacement information directly with the displacement vector, and transmit the displacement information to the display apparatus using the communication unit 17. The display apparatus performs coordinate transformation to the displacement vector received thereafter and correspondingly controls the operation of the pointer or the graphical user interface displayed.

It is worth to note that the functionality of the processing module 15 may be implemented by a processing chip programmed with necessary firmware and disposed inside the optical input device 1. The processing chip can include but is not limited to a microcontroller, or an embedded controller, however the present disclosure is not limited to the example provided herein The memory unit 16 in the instant embodiment can be implemented by a volatile or a non-volatile memory such as a flash memory, a read only memory, or a random access memory, and the instant embodiment is not limited to the example provided herein. The communication unit 17 can be implemented by a wired transmission interface such as, a USB interface or PS/2 interface, or a wireless transmission interface e.g., a Bluetooth interface, or a Wi-Fi interface. The exact type, the exact structure, and/or implementation method associated with the communication unit 17 can be configured according to the type and exact structure of the display apparatus and the optical navigation device 1, thus the present disclosure is not limited thereto. Moreover, in one embodiment, the processing module 15, the image sensor 14, the memory unit 16, and/or the communication unit 17 may be fabricated into one single IC chip.

It shall be noted that that the internal structure of the optical navigation device 1 may vary according to specific design structure and/or practical operation requirement of the optical navigation device 1. Thus, FIG. 2 is merely used to illustrate an implementation of the optical navigation device 1 and the present disclosure is not limited thereto. FIG. 5A and FIG. 5B are merely used to illustrate operations of the image sensor 14 of different imaging array size and the present disclosure is not limited thereto. Similarly, FIG. 6 is merely used to illustrate an implementation of the processing module 15 and the present disclosure is not limited thereto.

The tracking performance of the optical navigation device 1 with the image sensor 14 oriented at different angles with respect to the long axis of the device body 11 over various types of navigation surface is summarized in Table 1 below.

TABLE 1

| Surface Type | Rotation angle of the image sensor frame rate: 8000 fps | | |
| --- | --- | --- | --- |
| | 0° | 45° | 90° |
| Surface 01 | 160 ips | 180 ips | 140 ips |
| Surface 02 | 160 ips | 180 ips | 160 ips |
| Surface 03 | 160 ips | 200 ips | 160 ips |
| Surface 04 | 160 ips | 260 ips | 160 ips |
| Surface 05 | 160 ips | 240 ips | 160 ips |

It can be noted from Table 1, the tracking speed of the image sensor 14 is at the greatest when being oriented at 45 degree with respect to the long axis LA of the device body 11 for various types of reflective or dark surfaces tested. The experiment results show that by having the image sensor 14 rotated at an angle, with different type of surfaces, the tracking speed can be enhanced by approximately 30~40%.

In summary, an exemplary embodiment of the present disclosure provides an optical navigation device, which by orienting a built-in image sensor at a preset angle with respect to a long axis of the optical navigation device can greatly enhance the tracking speed associated with the optical navigation device. That is, for the same imaging array size, the tracking speed of a rotated image sensor is faster than a non-rotated image sensor. The optical navigation device with the image sensor rotated further can achieve the same tracking speed at a lower frame rate, and thereby reduce the amount of power consumed during the tracking operation.

Additionally, the concept of enhancing the tracking speed by orienting the image sensor is applicable for all types of image sensors used in optical navigation applications. Moreover, the process of rotating the image sensor can be done during the assembly process of the optical navigation device without having to incur any additional manufacturing or design cost.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical navigation device, adapted to control an operation of a pointer on a display apparatus, the optical navigation device comprising:
   a device body comprising a housing with an opening, the housing having an accommodating space formed therein;
   a substrate having a lower surface, the substrate horizontally arranged in the accommodating space of the housing, wherein the lower surface of the substrate is parallel to a bottom plane of the device body;
   a light source disposed on the lower surface of the substrate, operatively generating a light illuminating a navigation surface of the optical navigation device through the opening of the housing;
   an image sensor disposed on the lower surface of the substrate, operatively capturing a plurality of images responsive to a reflected light reflected from the navigation surface to generate a plurality of frames according to a predetermined frame rate, wherein the image sensor, the light source, and the opening of the housing are arranged along a long axis of the device body or along an axis parallel to the long axis of the device body, the image sensor is oriented tiltly on the lower surface of the substrate at a preset angle with respect to a long axis of the device body, the image sensor is also parallel to the bottom plane of the device body and the image sensor has an active imaging array with a size of M columns of pixels by N rows of pixels, wherein M and N are integers, the M columns of pixels are perpendicular to the N rows of pixels, and each column of the active imaging array has the preset angle with respect to the long axis of the device body;
   a coordinate converting unit, configured to perform a coordinate transformation to a first displacement vector of the optical mouse computed relative to the navigation surface to generate a second displacement vector using a rotation matrix, wherein the displacement information of the optical mouse is generated according to the second displacement vector, wherein the second displacement vector is determined according to the first displacement vector and the rotation matrix; and
   a processing module disposed on the lower surface of the substrate and coupled to the light source and the image sensor, the processing module operatively generating a displacement information of the optical navigation device relative to the navigation surface according to at least one of the plurality of frames.

2. The optical navigation device according to the claim 1, wherein the image sensor is oriented at a non-zero angle with respect to the long axis of the device body.

3. The optical navigation device according to the claim 1, wherein the preset angle is between 0 to 90 degrees exclusive with respect to the long axis of the device body.

4. The optical navigation device according to the claim 3, wherein a 45 degree angle is defined between the long axis of the mouse body and a y-axis of the image sensor.

5. The optical navigation device according to the claim 1, wherein the processing module further comprises:
   a coordinate converting unit, configured to perform a coordinate transformation to a first displacement vector of the optical navigation device computed relative to the navigation surface, to generate a second displacement vector;
   wherein the displacement information of the optical navigation device is generated according to the second displacement vector.

6. The optical navigation device according to the claim 5, wherein the coordinate converting unit performs the coordinate transformation to the first displacement vector by applying a rotation matrix to the first displacement vector to generate the second displacement vector, wherein the rotation matrix is configured based on the preset angle of the image sensor with respect to the long axis of the device body.

7. The optical navigation device according to the claim 1, wherein the image sensor counter-rotates the plurality of images captured according to the preset angle of the image sensor relative to the long axis of the device body to generate the plurality of frames.

8. The optical navigation device according to claim 1, wherein the image sensor has an active imaging array size of M by M, wherein M is an integer.

9. The optical navigation device according to claim 8, wherein the image sensor is a charged-couple device image sensor or a complementary metal oxide semiconductor image sensor.

10. The optical navigation device according to the claim 1, further comprising:
a lens disposed between the image sensor and the navigation surface and configured to direct the reflected light being reflected from the navigation surface onto the image sensor.

11. The optical navigation device according to the claim 1, further comprising:
a sensor holder mounted on the substrate, the sensor holder oriented at the preset angle with respect to the long axis of the device body;
wherein the image sensor is mounted on the sensor holder such that the image sensor is oriented at the preset angle with respect to the long axis of the device body.

12. The optical navigation device according to the claim 1, wherein the optical navigation device operatively transmits the displacement information to the display apparatus to control the operation of the pointer on the display apparatus.

13. An optical mouse, comprising:
a mouse body comprising a housing with an opening, the housing having an accommodating space formed therein;
a substrate having a lower surface, the substrate horizontally arranged in the accommodating space of the housing, wherein the lower surface of the substrate is parallel to a bottom plane of the device body;
a light source disposed on the lower surface of the substrate, operatively generating a light illuminating a navigation surface of the optical mouse through the opening of the housing;
an image sensor disposed on the lower surface of the substrate, operatively capturing a plurality of images responsive to a reflected light reflected from the navigation surface to generate a plurality of frames according to a predetermined frame rate wherein the image sensor, the light source, and the opening of the housing are arranged along a long axis of the device body or along an axis parallel to the long axis of the device body, the image sensor is oriented tiltly on the lower surface of the substrate at a preset angle with respect to a long axis of the device body, the image sensor is also parallel to the bottom plane of the device body and the image sensor has an active imaging array with a size of M columns of pixels by N rows of pixels, wherein M and N are integers, the M columns of pixels are perpendicular to the N rows of pixels, and each column of the active imaging array has the preset angle with respect to the long axis of the device body;
a coordinate converting unit, configured to perform a coordinate transformation to a first displacement vector of the optical mouse computed relative to the navigation surface to generate a second displacement vector using a rotation matrix, wherein the displacement information of the optical mouse is generated according to the second displacement vector, wherein the second displacement vector is determined according to the first displacement vector and the rotation matrix; and
a processing module disposed on the lower surface of the substrate and coupled to the light source and the image sensor, the processing module operatively generating a displacement information of the optical mouse relative to the navigation surface according to at least one of the plurality of frames;
wherein the preset angle between 1 to 89 degrees is defined between a long axis of the mouse body and a y-axis of the image sensor.

14. The optical mouse according to the claim 13, wherein the processing module further comprises
a coordinate converting unit, configured to perform a coordinate transformation to a first displacement vector of the optical mouse computed relative to the navigation surface using a rotation matrix configured based on the preset angle of the image sensor relative to the long axis of the mouse body to generate a second displacement vector;
wherein the displacement information of the optical mouse is generated according to the second displacement vector.

15. The optical mouse according to claim 13, wherein the image sensor has an active imaging array size of M by M, wherein M is an integer.

16. The optical mouse according to claim 15, wherein the image sensor is a charged-couple device image sensor or a complementary metal oxide semiconductor image sensor.

17. An optical mouse, comprising:
a mouse body comprising a housing with an opening, the housing having an accommodating space formed therein;
a substrate having a lower surface, the substrate horizontally arranged in the accommodating space of the housing, wherein the lower surface of the substrate is parallel to a bottom plane of the device body;
a light source disposed on the lower surface of the substrate, operatively generating a light illuminating a navigation surface of the optical mouse through the opening of the housing;
an image sensor disposed on the lower surface of the substrate, operatively capturing a plurality of images responsive to a reflected light reflected from the navigation surface over which the optical mouse moves to generate a plurality of frames according to a predetermined frame rate, wherein the image sensor, the light source, and the opening of the housing are arranged along a long axis of the device body or along an axis parallel to the long axis of the device body, the image sensor is oriented tiltly on the lower surface of the substrate at a preset angle with respect to a long axis of the device body, the image sensor is also parallel to the bottom plane of the device body and the image sensor has an active imaging array with a size of M columns of pixels by N rows of pixels, wherein M and N are integers, the M columns of pixels are perpendicular to the N rows of pixels, and each column of the active imaging array has the preset angle with respect to the long axis of the device body;

a processing module disposed on the lower surface of the substrate and coupled to the light source and the image sensor, the processing module operatively generating a displacement information of the optical mouse relative to the navigation surface according to at least one of the plurality of frames; and a coordinate converting unit, configured to perform a coordinate transformation to a first displacement vector of the optical mouse computed relative to the navigation surface to generate a second displacement vector using a rotation matrix, wherein the displacement information of the optical mouse is generated according to the second displacement vector, wherein the second displacement vector is determined according to the first displacement vector and the rotation matrix;

wherein the preset angle is a 45 degree angle.

18. The optical mouse according to the claim 17, wherein the second displacement vector is generated by using the equation of $\overline{D2}=\overline{R}\cdot\overline{D1}$, wherein $\overline{D1}$ represents the first displacement vector; $\overline{D2}$ represents the second displacement vector; $\overline{R}$ represents the rotation matrix and $\overline{R}$ is $$\begin{bmatrix} \cos 45° & -\sin 45° \\ \sin 45° & \cos 45° \end{bmatrix}.$$

19. The optical mouse according to claim 17, wherein the image sensor has an active imaging array size of M by M, wherein M is an integer.

20. The optical mouse according to claim 19, wherein the image sensor is a charged-couple device image sensor or a complementary metal oxide semiconductor image sensor.

* * * * *